(No Model.)

T. E. DOYLE.
WASHBOWL FIXTURE.

No. 575,924. Patented Jan. 26, 1897.

Witnesses.
Wm. M. Rheem.
Florence Embrey.

Inventor.
Thomas E. Doyle
by Walter H. Chamberlin Atty

UNITED STATES PATENT OFFICE.

THOMAS E. DOYLE, OF CHICAGO, ILLINOIS.

WASHBOWL-FIXTURE.

SPECIFICATION forming part of Letters Patent No. 575,924, dated January 26, 1897.

Application filed August 24, 1895. Serial No. 560,392. (No model.)

*To all whom it may concern:*

Be it known that I, THOMAS E. DOYLE, a citizen of the United States, residing at Chicago, county of Cook, State of Illinois, have invented a certain new and useful Improvement in Washbowl-Fasteners; and I declare the following to be a full, clear, and exact description of the invention, such as will enable others skilled in the art to which it pertains to make and use the same, reference being had to the accompanying drawings, which form a part of this specification.

My invention has for its object the production of a simple and cheap device for fastening the bowls of washstands and the like to the tops or slabs thereof. As is well known, most of the small washstands now in use have a slab of marble or some composition with the proper-sized opening therein and a bowl fastened to the under side of the slab beneath the opening. It is the device for fastening the slab and bowl together to which my invention relates. Heretofore it has been customary to drill small holes or orifices in the under surface of the marble adjacent to the point where it is desired to attach the bowl, insert the ends of metal bolts in these orifices, and then fill the orifices either with lead, solder, plaster-of-paris, or something similar, so as to fix the bolt in as rigid a manner as possible in the slab, but this lead or solder or plaster-of-paris or whatever is employed to hold the bolt in the slab becomes loose, and the bolts pull out and trouble ensues.

To prevent the bolt from disengaging from the marble is the object of my invention, and I accomplish it in several ways, as hereinafter described.

Figure 1:
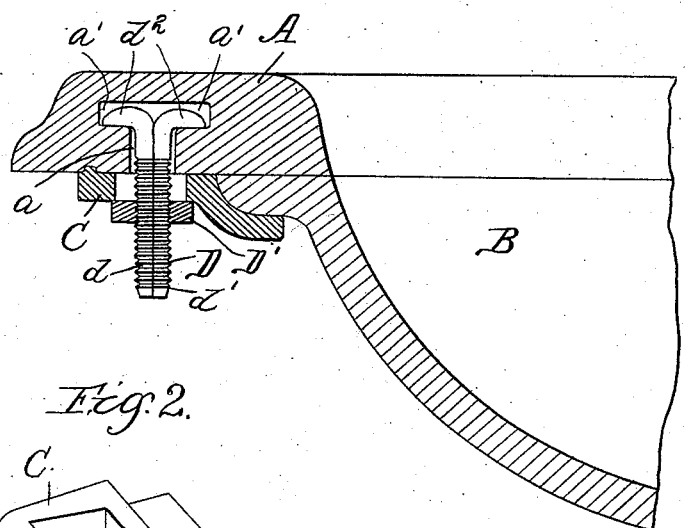
Figure 2:
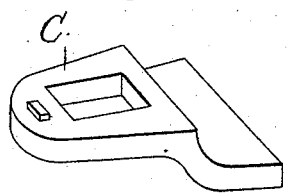

In the drawings, Figure 1 is a vertical section of a device embodying my invention. Fig. 2 is a perspective view of the clip C.

In carrying out the invention A represents the marble slab of a washstand, and B the bowl thereof.

C is a metal lip or clip which engages the edge of the bowl.

D is a bolt for engaging the clip C to the slab A. This bolt may be made in various ways, and I will describe the method of applying the construction shown in Fig. 1. In this figure the bolt is made of two halves $d\ d'$, semicircular in cross-section, each half having a projection $d^2$ extending at an angle from one end. The adjoining faces of the portions $d\ d'$ are flattened, so that when the two are placed together there is practically a single bolt with a projection $d^2$ in each direction. The under surface of the slab has an orifice $a$ bored into it, and from the inner end of this orifice lateral recesses $a'$ are formed. One half, $d$, of the bolt is then inserted with its projection $d^2$ in one of the lateral orifices $a'$. Then the other section, $d'$, of the bolt is inserted with the lateral projection $d^2$ entering the other lateral orifice $a'$. The two parts are then pulled downward until the projections rest firmly on the face of the recesses. The bolt is then passed through the metal clip C and the nut D' run on until the parts are firmly bound together.

It will be observed that a T-headed bolt is employed, and this T-head is engaged in the laterally-enlarged orifice in the slab, that is to say, I take the slabs as they are to-day, with the orifice bored therein, and instead of placing in the orifice the bolt and pouring hot lead around to fix it in place I insert the T-headed end of the divided bolt into the orifice and then by running on the nut and tightening the parts bring the T-head to a firm bearing in the lateral enlargement of the orifice in the slab, and this holds all the parts firmly in place.

What I claim is—

The combination with a washbowl, its covering-slab, and the clip for engaging the bowl, of a bolt for connecting the clip to the slab consisting of two portions semicircular in cross-section each having a lateral projection on its end brought together to form the complete bolt, said portions inserted in a bore or recess in the slab and each projection coming to a bearing in a lateral enlargement of said bore or recess, substantially as described.

In testimony whereof I sign this specification in the presence of two witnesses.

THOMAS E. DOYLE.

Witnesses:
W. H. CHAMBERLIN,
FLORENCE EMBREY.